(12) United States Patent
Furihata et al.

(10) Patent No.: US 11,630,442 B2
(45) Date of Patent: Apr. 18, 2023

(54) APPARATUS, COMPUTER-READABLE RECORDING MEDIUM, AND METHOD

(71) Applicants: Yokogawa Electric Corporation, Tokyo (JP); Shikaden Corporation, Tokyo (JP)

(72) Inventors: Ryouhei Furihata, Tokyo (JP); Yusuke Yokota, Tokyo (JP); Takahiro Kinoshita, Tokyo (JP); Toshiaki Kase, Tokyo (JP)

(73) Assignees: Yokogawa Electric Corporation, Tokyo (JP); Shikaden Corporation, Tokyo (JP)

( * ) Notice: Subject to any disclaimer, the term of this patent is extended or adjusted under 35 U.S.C. 154(b) by 253 days.

(21) Appl. No.: 16/550,285

(22) Filed: Aug. 26, 2019

(65) Prior Publication Data
US 2020/0073368 A1 Mar. 5, 2020

(30) Foreign Application Priority Data
Aug. 28, 2018 (JP) .............................. JP2018-159639

(51) Int. Cl.
| | | |
|---|---|---|
| G05B 19/418 | (2006.01) | |
| G06F 16/25 | (2019.01) | |
| G06F 16/20 | (2019.01) | |
| G06F 11/07 | (2006.01) | |
| G06F 11/32 | (2006.01) | |
| G12B 13/00 | (2006.01) | |

(52) U.S. Cl.
CPC ..... *G05B 19/4183* (2013.01); *G05B 19/4184* (2013.01); *G06F 11/0766* (2013.01); *G06F 11/321* (2013.01); *G06F 16/20* (2019.01); *G06F 16/25* (2019.01); *G12B 13/00* (2013.01)

(58) Field of Classification Search
CPC ...... G05B 19/4183; G05B 2219/39058; G01D 18/00; G01L 27/002
See application file for complete search history.

(56) References Cited

U.S. PATENT DOCUMENTS

| | | | |
|---|---|---|---|
| 5,796,602 A | 8/1998 | Wellan | |
| 5,944,048 A * | 8/1999 | Bump | ................... G01F 15/024 137/486 |

(Continued)

FOREIGN PATENT DOCUMENTS

| | | | | |
|---|---|---|---|---|
| JP | H09288510 A | * | 4/1996 | ............. G05B 23/02 |
| JP | H11211515 A | * | 1/1998 | |

(Continued)

OTHER PUBLICATIONS

JPH09288510A Machine Translation (Year: 1996).*
(Continued)

*Primary Examiner* — Michael W Hotchkiss

(57) ABSTRACT

To effectively utilize work information acquired by maintenance of an instrument in a plant, an apparatus is provided, which includes an acquisition unit that acquires work information about at least one of a calibration or an adjustment performed on the instrument in a plant; an extraction unit that extracts a plurality of data elements to be included in output information having a predetermined output format from the work information; and a generation unit that generates the output information from the plurality of data elements.

13 Claims, 8 Drawing Sheets

(56) References Cited

U.S. PATENT DOCUMENTS

| | | | |
|---|---|---|---|
| 6,615,114 B1 | 9/2003 | Skiba | |
| 7,124,047 B2* | 10/2006 | Zhang | G01D 18/008 |
| | | | 714/47.1 |
| 7,328,078 B2* | 2/2008 | Sanford | G05B 23/0245 |
| | | | 700/108 |
| 10,126,921 B2* | 11/2018 | Furihata | G05B 19/0425 |
| 10,316,988 B2* | 6/2019 | Junk | F16K 37/0083 |
| 10,599,134 B2* | 3/2020 | Benson | G05B 19/0423 |
| 10,969,259 B2* | 4/2021 | Sawada | G01F 25/15 |
| 11,003,178 B2* | 5/2021 | Fujita | G05B 23/0243 |
| 2004/0249592 A1* | 12/2004 | Koukol, Jr. | G01F 25/00 |
| | | | 702/88 |
| 2008/0040449 A1* | 2/2008 | Grant | H04L 67/04 |
| | | | 709/218 |
| 2008/0075012 A1* | 3/2008 | Zielinski | H04L 12/42 |
| | | | 370/241 |
| 2011/0276828 A1* | 11/2011 | Tamaki | G05B 23/0254 |
| | | | 714/26 |
| 2012/0038760 A1* | 2/2012 | Kantzes | G06Q 10/06315 |
| | | | 348/61 |
| 2013/0024495 A1* | 1/2013 | Armstrong | G05B 19/0426 |
| | | | 709/203 |
| 2013/0030555 A1* | 1/2013 | Starr | G05B 23/0216 |
| | | | 700/83 |
| 2013/0030746 A1* | 1/2013 | Vaissiere | G01F 25/00 |
| | | | 702/88 |
| 2013/0097128 A1* | 4/2013 | Suzuki | G06F 16/2365 |
| | | | 707/693 |
| 2014/0074559 A1* | 3/2014 | Karunakaran | G06Q 10/0637 |
| | | | 705/7.36 |
| 2014/0257756 A1* | 9/2014 | van der Linde | G01F 1/00 |
| | | | 702/189 |
| 2015/0019151 A1* | 1/2015 | Vaissiere | G01D 18/008 |
| | | | 702/85 |
| 2016/0169716 A1* | 6/2016 | Laflen | G01D 5/245 |
| | | | 702/85 |
| 2016/0202693 A1* | 7/2016 | Noda | G05B 23/0283 |
| | | | 702/183 |

FOREIGN PATENT DOCUMENTS

| | | | | |
|---|---|---|---|---|
| JP | H10325776 A | | 12/1998 | |
| JP | 2000315110 A | | 11/2000 | |
| JP | 2005043121 A | * | 2/2005 | |
| JP | 2008191821 A | | 8/2008 | |
| JP | 2017049148 A | | 3/2017 | |
| JP | 2017049148 A | * | 9/2017 | G01R 27/02 |
| JP | 2018005392 A | | 1/2018 | |

OTHER PUBLICATIONS

JPH11211515A Machine Translation (Year: 1998).*
JP2017049148A Machine Translation (Year: 2017).*
JP-2005043121-A Machine Translation (Year: 2005).*
Extended European Search Report for European Patent Application No. 19193621.0, issued by the European Patent Office dated Jan. 27, 2020.
"Pressure Calibrator CA700", Bulletin CA700-EN, 2013, pp. 1-12, Yokogawa Meters and Instruments Corporation, Japan.
"OpreX Asset Management and Integrity—Versatile Device Management Wizard", Bulletin 01R01A01-00EN, 2005, pp. 1-6, Yokogawa Electric Corporation, Japan.
Office Action issued for counterpart Japanese Application No. 2018-159639, issued by the Japan Patent Office dated Dec. 1, 2020 (drafted on Nov. 20, 2020).
Kitamura Natsumi,"The technology of 'Intelligent sensor management' for increasing the efficiency of the processing and the reduction of the downtime and the time required", Japan, Industrial technology, Mar. 1, 2013, vol. 56, No. 3, p. 11-14, pp.

* cited by examiner

WORKER INFORMATION

- NAME OF WORKER
- DEPARTMENT

TARGET INSTRUMENT INFORMATION

- INSTRUMENT IDENTIFICATION INFORMATION
- INSTRUMENT TYPE INFORMATION
- INSTRUMENT OPTION
- DATE OF MANUFACTURE
- WORKING DAY

CALIBRATION WORK INFORMATION

- CALIBRATION SITUATION
- CALIBRATION RESULT
- WORK START DATE AND TIME
- WORK END DATE AND TIME
- WORKING TIME

ADJUSTMENT WORK INFORMATION

- ADJUSTMENT RESULT
- WORK START DATE AND TIME
- WORK END DATE AND TIME
- WORKING TIME

*FIG. 3*

APPARATUS, COMPUTER-READABLE RECORDING MEDIUM, AND METHOD

The contents of the following Japanese patent application(s) are incorporated herein by reference:
No. 2018-159639 filed in JP on Aug. 28, 2018

BACKGROUND

1. Technical Field

The present invention relates to an apparatus, a computer-readable recording medium, and a method.

2. Related Art

A plant is provided with an instrument such as a pressure gauge and a flowmeter. Conventionally, a worker who maintains the plant has performed a calibration or an adjustment to each instrument and summarized work information such as a calibration result or an adjustment result in a report or the like.

Conventionally, although the work information obtained by the worker is sometimes used to create the report, the work information is not in a form that can be easily used for an analysis/diagnosis of the plant or the instrument and thus it is not possible to sufficiently use the work information.

SUMMARY

To solve the above-described problem, a device is provided in a first aspect of the present invention. The device may include an acquisition unit that acquires work information about at least one of a calibration or an adjustment performed on the instrument in a plant. The device may include an extraction unit that extracts, from the work information, a plurality of data elements that are to be included in output information having a predetermined output format. The device may include a generation unit that generates the output information from the plurality of data elements.

The acquisition unit may receive the work information from a maintenance apparatus that performs at least one of the calibration or the adjustment to the instrument.

The extraction unit may store a plurality of input formats corresponding to a plurality of types of maintenance apparatuses. The extraction unit may extract the plurality of data elements from the work information using an input format corresponding to a type of a target maintenance apparatus from the plurality of input formats.

The generation unit may arrange the plurality of data elements in an order defined by the output format and generate the output information.

The generation unit may cause a result acquired by performing an operation defined by the output format on at least one data element of the plurality of data elements to be included in a part of the output information.

The device may include a storage processing unit that performs a process of storing, to a storage device, the output information generated by a generation unit.

The device may further include a display processing unit that performs a process of displaying, on a display device, display information according to a plurality of pieces of work information that are acquired at different dates and times.

The generation unit may generate the output information including a measurement error of the instrument that is a measuring device. The display processing unit may perform a process of displaying, to the display device, the change with time of the measurement error of the instrument.

The display processing unit may perform a process of causing the display device to display the change with time of the measurement error of each of a plurality of the instruments in a comparable manner.

The generation unit may generate the output information including a worker who performs at least one of the calibration or the adjustment and working time required to perform at least one of the calibration or the adjustment. The display processing unit may perform a process of displaying, to the display device, the working time for each worker.

In a second aspect of the present invention, a computer-readable recording medium is provided, which records a program executed by a computer. The program may be for causing a computer to function as an acquisition unit that acquires work information about at least one of a calibration or an adjustment performed on the instrument in a plant. The program may be for causing a computer to function as an extraction unit that extracts a plurality of data elements that are to be included in output information having a predetermined output format from the work information. The program may be for causing a computer to function as a generation unit that generates the output information from the plurality of data elements.

The acquisition unit may receive the work information from a maintenance apparatus that performs at least one of the calibration or the adjustment on the instrument.

In a third aspect of the present invention, a method is provided. The method includes acquiring, by a device, work information about at least one of a calibration or an adjustment performed to the instrument in a plant. The method includes extracting, by the device, a plurality of data elements to be included in output information having predetermined output format from the work information. The method includes generating, by the device, the output information from the plurality of data elements.

The summary clause does not necessarily describe all necessary features of the embodiments of the present invention. The present invention may also be a sub-combination of the features described above.

BRIEF DESCRIPTION OF THE DRAWINGS

FIG. 3 illustrates one example of work information input by the apparatus 140 according to the present embodiment.

DESCRIPTION OF EXEMPLARY EMBODIMENTS

Hereinafter, although the present invention is described through the embodiments of the invention, the embodiments blow do not limit the invention according to the claims. Further, not all combinations of features described in the embodiments are essential to the solution of the invention.

Figure 1:
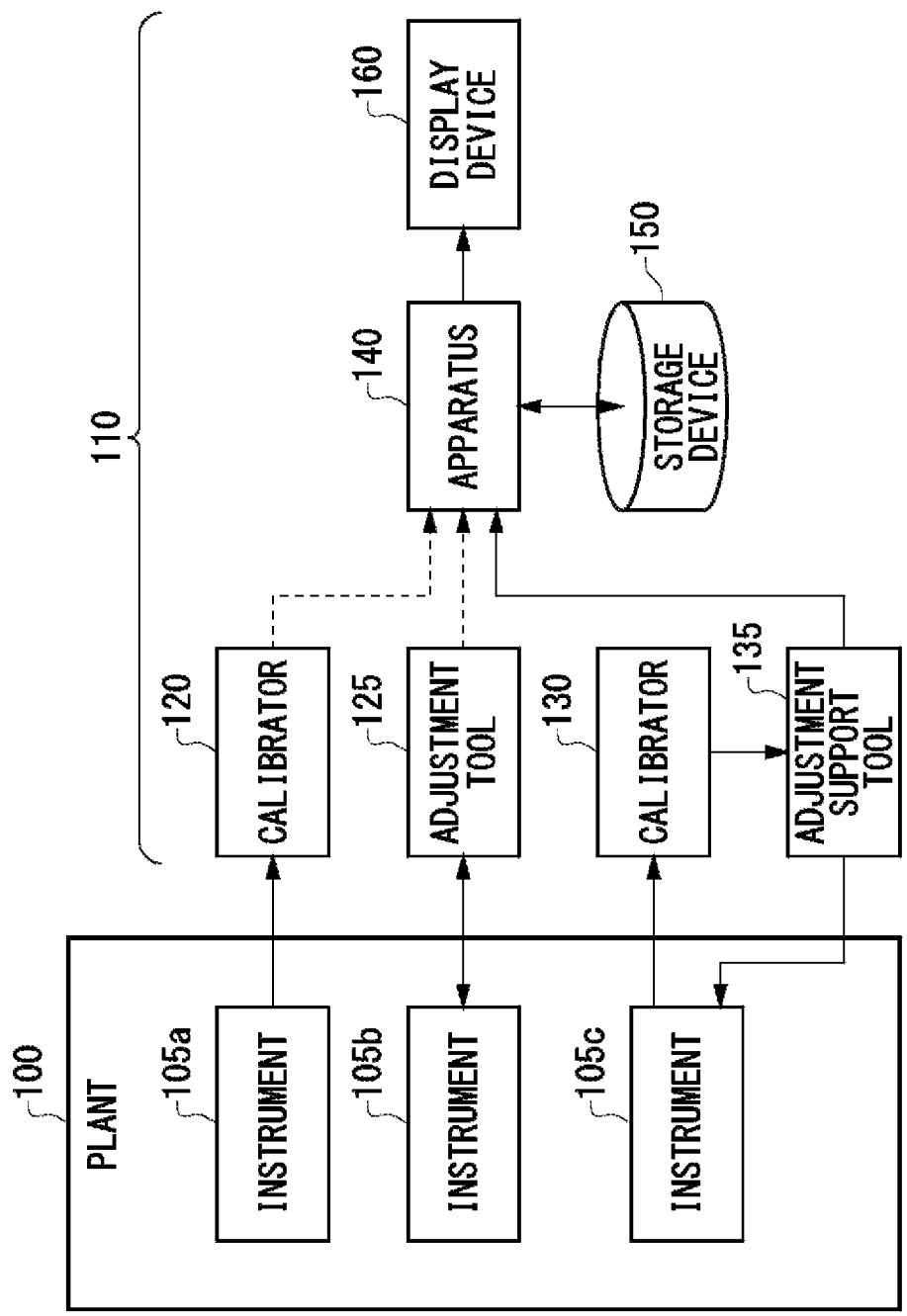
FIG. 1 illustrates a maintenance system 110 according to the present embodiment together with a plant 100.

FIG. 1 illustrates a maintenance system 110 according to the present embodiment together with a plant 100. The maintenance system 110 collects work information that can be acquired by performing at least one of a calibration or an adjustment on instruments 105*a* to 105*c* in the plant 100 and registers the thus acquired work information in a storage device 150. Accordingly, the maintenance system 110 can use the collected work information for an analysis/diagnosis of the plant 100 and the instruments 105*a* to 105*c*.

The plant 100 may be, as one example, an industrial plant such as chemical, a plant that manages and controls wellheads such as gas fields and oil fields and their surroundings, a plant that manages and controls power generation such as hydropower, thermal power and nuclear power, and a plant that manages and controls environmental power generation such as solar light and wind power, or a plant that manages and controls up and down water and dams. The plant 100 includes the instruments 105*a* to 105*c* (also referred to as "instrument 105").

Each instrument 105 may be a field device, for example, may be a sensor device such as a pressure gauge, a flow meter, and a temperature sensor, valve devices such as flow control valves and on-off valves, actuator devices such as fans and motors, imaging devices such as camera and video that capture images of the situation or the object in the plant, audio devices such as microphones and speakers that collect abnormal noise and the like in the plant and emit alarm sounds, position detection devices that output position information of each device, and other devices. In the present embodiment, each instrument 105 is a field device that can be subjected to the calibration or adjustment.

The maintenance system 110 includes a calibrator 120, an adjustment tool 125, a calibrator 130, an adjustment support tool 135, an apparatus 140, a storage device 150, and a display device 160. The calibrator 120, the adjustment tool 125, the calibrator 130, and the adjustment support tool 135 are maintenance apparatuses that perform at least one of the calibration or the adjustment on the instruments 105*a* to 105*c*. Here, the term "calibration" means an operation of confirming a state of the instrument, that is, for example, an operation or the like of measuring a measurement error of a pressure gauge or the like, and the term "adjustment" means an operation of changing a state of the instrument to a state as it should be, that is, for example, an operation or the like of changing the setting of the pressure gauge such that the measurement error of the pressure gauge or the like becomes zero. In the present specification, performing at least one of the calibration or the adjustment is also referred to as performing a "maintenance," and information about at least one of the calibration or the adjustment performed on the instruments 105*a* to 105*c*, that are, for example, information about at least one of the calibration result or the adjustment result is also referred to as "work information."

In an example of the present drawing, the calibrator 120 is used for the calibration of the instrument 105*a*. The calibrator 120 is not connected to the apparatus 140 via a wired/wireless line and displays a calibration result on a screen of the calibrator 120. The adjustment tool 125 is used for the adjustment of the instrument 105*b*. The adjustment tool 125 is not connected to the apparatus 140 via a wired/wireless line and displays an adjustment result on a screen of the adjustment tool 125. The calibrator 130 and the adjustment support tool 135 are used for the calibration or the adjustment of the instrument 105*c*.

The adjustment support tool 135 is connected to the calibrator 130 such as a pressure calibrator, controls the calibrator 130 to cause the calibrator 130 to perform the calibrate process, and adjusts a parameter of the instrument 105*c* according to a calibration result. Further, the adjustment support tool 135 is connected to the apparatus 140 via a wired/wireless line and transmits, to the apparatus 140, work information including the calibration result or the adjustment result of the instrument 105*c*. The adjustment support tool 135 may have functions to control the calibrator 130, record the calibration result or the adjustment result, adjust the instrument 105 to be connected, perform a pass/fail judgment of the instrument 105, and create a report, and also have functions to sequentially record pieces of work information about each of the plurality of instruments 105 to which the maintenance is performed and transmit the work information to the apparatus 140. Examples of such adjustment support tool 135 include Yokogawa Electric Corporation's "FieldMate (registered trademark)."

The apparatus 140 acquires work information output by one or more maintenance apparatuses such as the calibrator 120, the adjustment tool 125, and the adjustment support tool 135 through a manual input by a worker (in the case of calibrator 120 and adjustment tool 125 in the present example) or through a communication with the maintenance apparatus (in the case of adjustment support tool 135 in the present example). The apparatus 140 converts the work information acquired from various maintenance apparatuses to a format for output to generate output information and registers the output information in the storage device 150. Further, the apparatus 140 causes a display device 160 to display the output information registered in the storage device 150 in a display format that allows analysis/diagnosis. Note that, the calibrator 120 and the adjustment tool 125 may also be connected to the apparatus 140 via the wired/wireless line. Further, the adjustment support tool 135 may not be connected to the apparatus 140 via the wired/wireless line, either.

The apparatus 140 may also be realized by a computer such as a PC (personal computer), a tablet computer, a smartphone, a workstation, a server computer, or a general-purpose computer, and may be realized by a computer system in which a plurality of computers are connected. Such a computer system is also a computer in a broad sense. Instead of this, the apparatus 140 may also be a dedicated computer designed to collect and use the work information, or may also be a dedicated hardware realized by a dedicated circuit. The apparatus 140 may also be incorporated in the adjustment support tool 135 to be realized as one function of the adjustment support tool 135, may also be realized as a service on a cloud computer provided to each of one or more clients owning the plant, or may be a device that is independent of the adjustment support tool 135 or the like provided in the maintenance system 110 for the plant 100 as illustrated in the present drawing. Further, the apparatus 140 may also be incorporated in any of the calibrator 120, the adjustment tool 125, the calibrator 130, and the display device 160 to be realized as one function of them.

The storage device 150 registers the output information in response to a request from the apparatus 140. Accordingly, the storage device 150 stores, from each of one or more maintenance apparatuses, a plurality of pieces of output information based on the work information collected at time points that may be different from each other. The storage device 150 may be a storage device integrally provided with the apparatus 140, may also be a storage device installed in a control room or the like of the plant 100, and may be a storage device such as a cloud storage service or the like that is connected to the apparatus 140 via the Internet.

In response to the request from the apparatus 140, the display device 160 displays display information based on one or more pieces of output information stored in the storage device 150. Further, the display device 160 may also display the display information according to one or more pieces of output information acquired from the apparatus 140. Although in the present embodiment, the display device 160 is connected to the apparatus 140, the display device 160 may also be a computer or the like that is not directly connected to the apparatus 140, reads out the output information stored in the storage device 150 independently of the apparatus 140, and displays the display information according to the read output information. Further, the display device 160 may also be incorporated in the apparatus 140 to be realized as one function of them.

Figure 2:
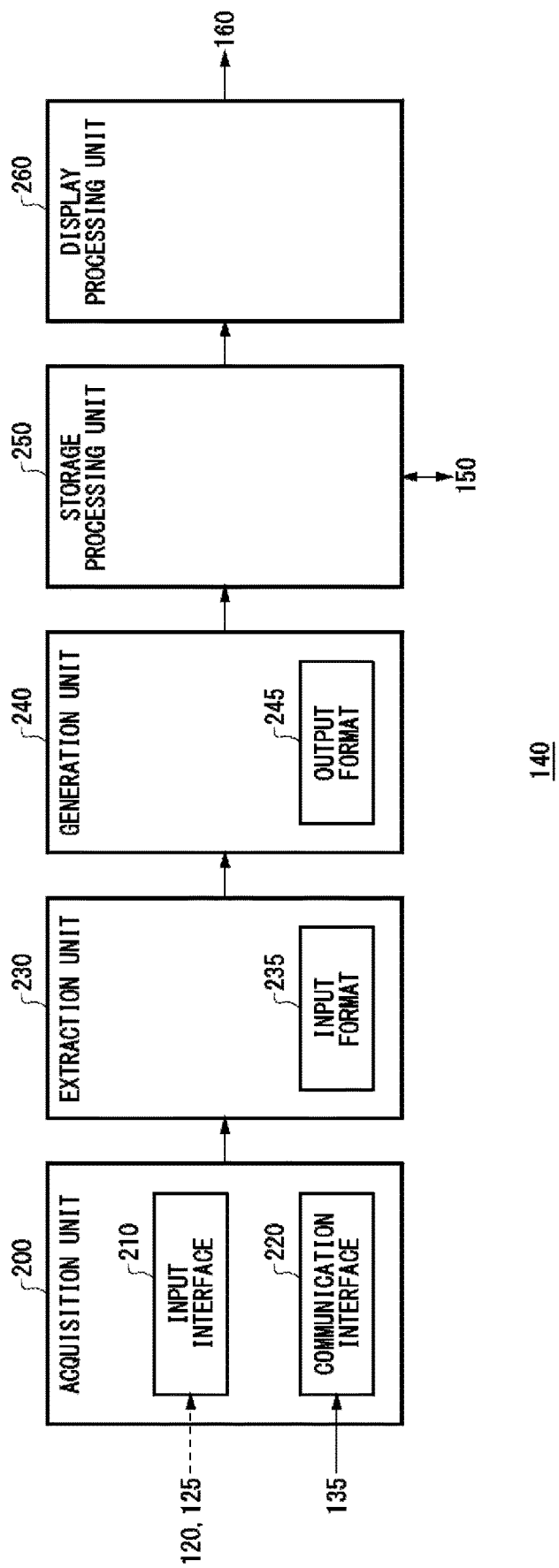
FIG. 2 illustrates a configuration of an apparatus 140 according to the present embodiment.

FIG. 2 illustrates a configuration of the apparatus 140 according to the present embodiment. The apparatus 140 includes an acquisition unit 200, an extraction unit 230, a generation unit 240, a storage processing unit 250, and a display processing unit 260. The acquisition unit 200 acquires the work information about at least one of the calibration or the adjustment performed on the one or more instruments 105. The acquisition unit 200 supplies the acquired work information to the extraction unit 230. The work information may also include at least one of the work information about the calibration (calibration work information) and the work information about the adjustment (adjustment work information), and may also include device type information for identifying a product name, a model name of the maintenance apparatus, and the types of other maintenance devices, device identification information for identifying individual maintenance apparatus, worker information about a worker who performs a work, and target instrument information about instrument to be worked. A specific example of the work information will be described later with reference to FIG. 3.

The acquisition unit 200 may include at least one an input interface 210 and a communication interface 220. The acquisition unit 200 may include the input interface 210 so that a worker manually inputs the work information from the maintenance apparatuses that do not have a wired or wireless connection function, such as calibrator 120 and adjustment tool 125. The input interface 210 displays an input screen for the work information about a display screen of the apparatus 140 so as to prompt the worker to input the work information.

The acquisition unit 200 may include the communication interface 220 so as to be connected to the maintenance apparatus having the wired or wireless connection function, such as the adjustment support tool 135. The communication interface 220 receives the work information from the adjustment support tool 135 to be connected, or the like. Accordingly, when the maintenance apparatuses have the wired or wireless connection function, the apparatus 140 can be connected to the maintenance apparatuses and receive the work information from the maintenance apparatuses, and thus a worker does not need to manually input the work information. When the adjustment support tool 135 is not connected to the apparatus 140 through the wired/wireless line, the work information of the adjustment support tool 135 may also be stored in the apparatus 140 by using a portable storage device such as a USB memory.

The extraction unit 230 receives the work information acquired by the acquisition unit 200. The extraction unit 230 extracts, from the pieces of received work information, a plurality of data elements to be included in the output information having the predetermined output format. The extraction unit 230 may store the input format 235 of the work information and extract necessary data elements from the work information using the input format 235. Here, the extraction unit 230 may store a plurality of input formats 235 corresponding to a plurality of types of maintenance apparatuses. In this case, the extraction unit 230 uses the input format 235 corresponding to a type of a target maintenance apparatus from the plurality of input formats 235 and extracts the plurality of data elements from the work information. Accordingly, the apparatus 140 can extract necessary data elements from various pieces of work information that differ depending on the types of the maintenance apparatuses.

The generation unit 240 receives a plurality of data elements that are extracted by the extraction unit 230 and generates the output information from the plurality of data elements. The generation unit 240 may store the output format 245 of the output information, arrange the plurality of data elements in an order defined by the output format 245, and generate the output information. Further, the output format 245 may also be defined to perform the operation on at least one data element of the plurality of data elements and generate data elements of the output information. In this case, the generation unit 240 causes a result acquired by performing the operation defined by the output format 245 on at least one data element defined by the output format 245 to be included in a part of the output information. Accordingly, the generation unit 240 can generate the output information in a form suitable for the analysis/diagnosis.

The storage processing unit 250 performs the process of storing the generated output information in the storage device 150. The display processing unit 260 performs the display processing for displaying the output information stored by the storage processing unit 250 to the display device 160. The display processing unit 260 may also perform a process of displaying the output information stored in the storage device 150 in a format that allows the analysis/diagnosis such as graph format and perform the statistical processing to the output information stored in the storage device 150 and displaying the output information. Further, the display processing unit 260 may also be incorporated in the display device 160 to be realized as one function of them. Also, when the storage processing unit 250 is absent, the display processing unit 260 performs the display processing for causing the display device 160 to display the output information generated by the generation unit 240.

According to the apparatus 140 described above, it is possible to collect the pieces of work information about the work performed to each of the instruments in the plant and use the work information for the analysis/diagnosis. It is possible to store the work information in the storage device 150 and accordingly the stored work information can also be used for the analysis/diagnosis.

FIG. 3 illustrates one example of the work information input by the apparatus 140 according to the present embodiment. In the example of the present drawing, the work information includes the "worker information," the "target instrument information," the "calibration work information," and the "adjustment work information."

The "worker information" is information about a worker who performs a maintenance work. The "worker information" may include information for identifying a name of a worker, a department to which the worker belongs in an enterprise operating the plant 100, and other workers.

The "target instrument information" is information about the instrument to which the maintenance work is performed. The "target instrument information" may include instrument identification information for uniquely identifying the instrument such as a name, a manufacturing number, a serial number of the instrument, and others within the plant 100, the instrument type information for identifying a model name, a manufacturer name, and a type of the instrument such as instrument option information indicating options added to the instrument, and information about date of manufacture and date of start of operation of the instrument.

The "calibration work information" is information about a calibration work. The "calibration work information" may include information about, for example, a calibration situation indicating either a calibration result before the adjustment or a calibration result after an adjustment, a calibration result, start date and time of a calibration work, end date and time of the calibration work and working time and the like of the calibration work.

The "adjustment work information" is information about an adjustment work. The "adjustment work information" may include information about an adjustment result, start date and time of an adjustment work, end date and time of the adjustment work, and working time and the like of the adjustment work. As described above, the work information may further include other pieces of information such as device identification information of the maintenance apparatus and device type information of the maintenance apparatus, or the like.

Figure 4:
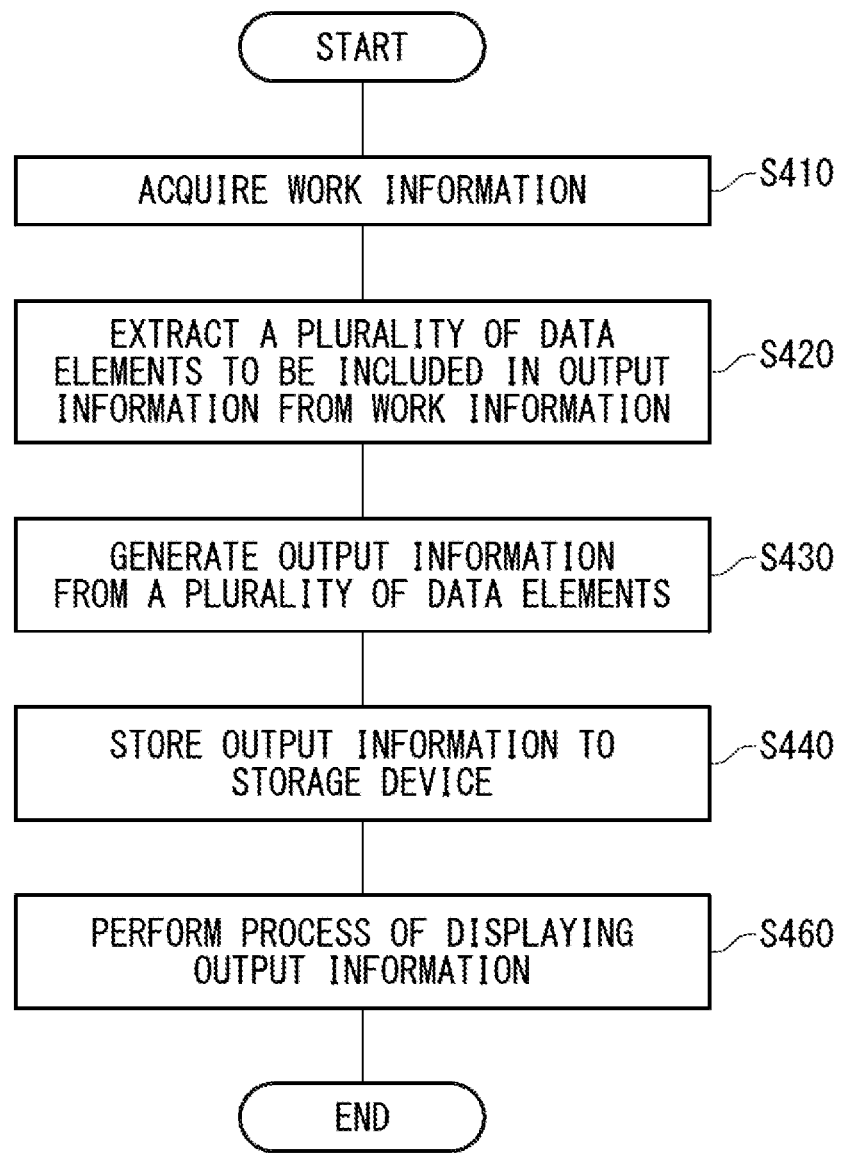
FIG. 4 illustrates an operation flow of the apparatus 140 according to the present embodiment.

FIG. 4 illustrates an operation flow of the apparatus 140 according to the present embodiment. In S410 (step 410), the acquisition unit 200 acquires the work information thorough an input by a worker or reception from the adjustment support tool 135 or the like via a communication line. When a maintenance apparatus such as the adjustment support tool 135 has a function to save the work information as a file, the acquisition unit 200 may acquire the work information from the file. In this case, not only the data element included in the work information is recorded in the contents of the file, but also the data element may be encoded into a file name and the like.

In S420, the extraction unit 230 extracts a plurality of data elements that are to be included in the output information from the work information based on the input format 235. The input format 235 defines which one or more data elements included in the work information is allocated to each of the plurality of data elements to be included in the output information. For example, when the work information is in a format of representing a value of each data element using a plurality of columns, the input format 235 specifies with which data element included in the output information, the value of the data element of what column in the work information is associated. Instead of this, the input format 235 may specify to which intermediate variable, the value of each data element in the work information is allocated. Further, when the work information is represented in a format including a plurality of sets of data element names and data element values, the input format 235 may be a list of data element names of a plurality of data elements to be included in the output information. The extraction unit 230 extracts the data element allocated to any data element of the output information from each data element included in the work information.

When the apparatus 140 can acquire the work information from a plurality of types of maintenance apparatuses, the extraction unit 230 uses at least one of the device identification information and the device type information of the maintenance apparatus to select the input format 235 compatible with the type of the target maintenance apparatus and use the input format for the extraction of the data element. For example, instead of storing the input format 235, the extraction unit 230 may extract the plurality of data elements according to the processing content implemented in the extraction program executed by an extraction unit 230 to extract the data element, and such extraction program is intrinsic to the input format 235.

In S430, the generation unit 240 generates the output information from the plurality of data elements extracted by the extraction unit 230. For example, the generation unit 240 arranges the plurality of extracted data elements in the order defined by the output format 245 and generates the output information in a format of representing the value of each data element using a plurality of columns. Accordingly, the generation unit 240 can rearrange in a common order defined by the output format 245, each data element output by various maintenance apparatuses in a different order for each model to acquire the output information that can be easily used later.

Further, the generation unit 240 may cause the result acquired by performing the operation defined by the output format 245 on one or more data elements to be included in a part of the output information as the data element of the output information. For example, the generation unit 240 may convert the measured value, that is for example 16, a 16-bit integer received from the maintenance apparatus into the current value indicated by the measured value and cause the current value to be included in the output information. Further, for example, the generation unit 240 may also cause an average measured value calculated based on a plurality of measured values received from the maintenance apparatus to be included in the output information. Accordingly, the generation unit 240 can convert the data elements that are in any format such as different units of data element, output by various maintenance apparatuses for each model to a format represented by a unit system common among the models. Further, the generation unit 240 can aggregate data elements such as a large number of measured values output by the maintenance apparatus to a value such as the maximum value and the average value that are used later to acquire the output information that can be easily used later.

Note that, instead of storing the output format 245, the generation unit 240 may generate the output information according to the processing content implemented in a generating program executed by the generation unit 240 to generate the output information from the plurality of data elements, for example, and such a generating program is intrinsic to the output format 245.

In S440, the storage processing unit 250 stores the output information generated by the generation unit 240 to the storage device 150. The storage processing unit 250 may also save each of the pieces of output information as one file or separate files. Instead of this, the storage processing unit 250 may also register each piece of output information in the database to compile the pieces of output information into a database and save the output information.

In S460, the display processing unit 260 performs the process of outputting display information according to the output information stored in the storage device 150. The display processing unit 260 may perform the process of displaying the output information stored in the storage device 150 as it is or may perform the process of displaying the output information by processing the output information.

Figure 5:
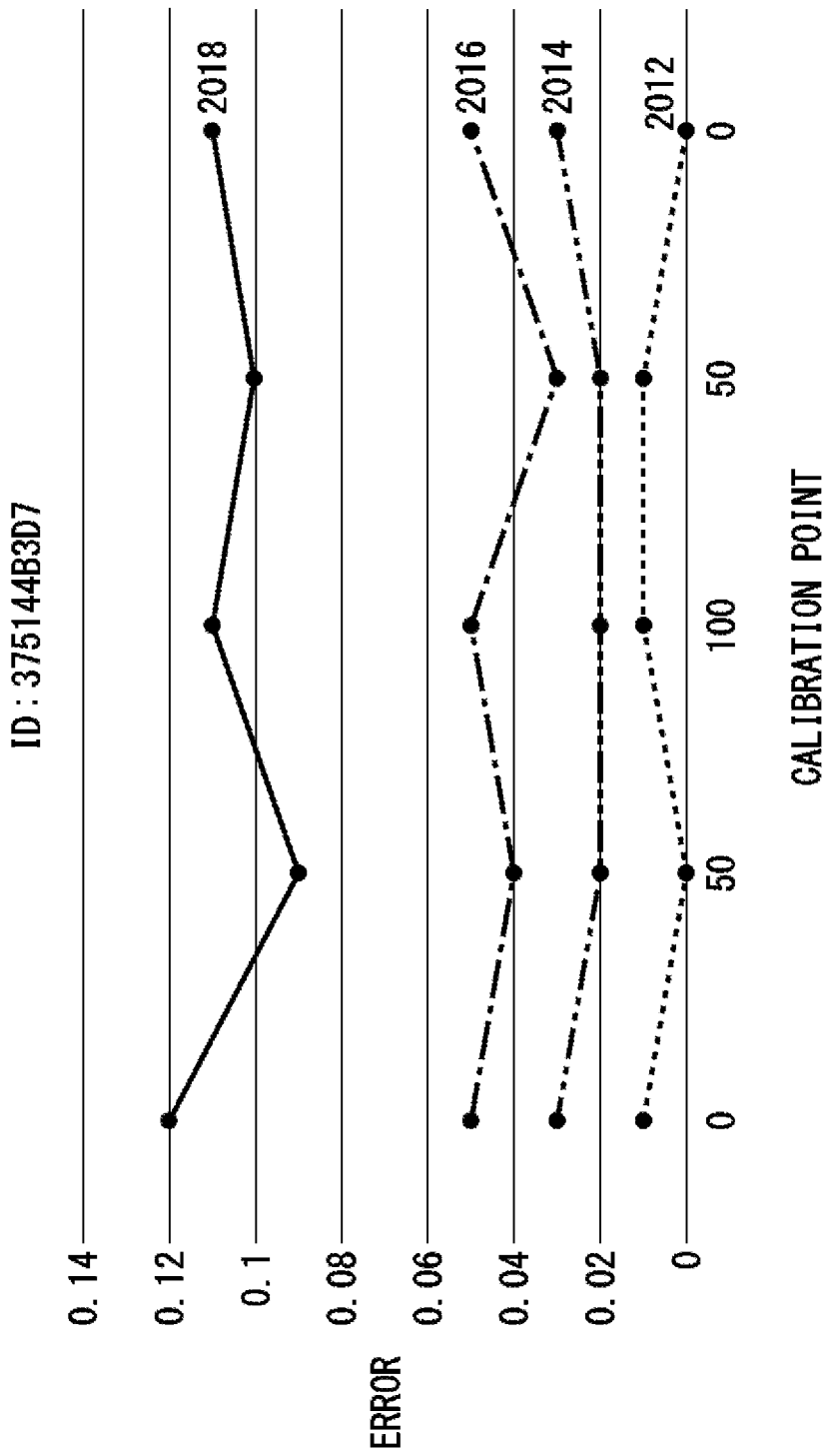
FIG. 5 illustrates a first example of the display information by the apparatus 140 according to the present embodiment.

FIG. 5 illustrates a first example of the display information by the apparatus 140 according to the present embodiment. In the present example, the display processing unit 260 performs the process of displaying, to the display device 160, the display information indicating a tendency of the aging degradation of the instrument specified by a user, that is, for example, the instrument whose instrument identification number (ID) is 375144B3D7 (hexadecimal number).

In the present example of the display information, a graph indicates a calibration point on a horizontal axis and indicates an error on a vertical axis. For example, the instrument 105, that is a measuring device, such as pressure gauge, can measure a parameter to be measured (such as pressure) within a measurement range defined by the specification of the instrument 105. A worker uses maintenance apparatuses such as the calibrator 120, the calibrator 130, and the adjustment support tool 135 to perform the calibration work to the instrument 105. In the calibration of the present example, the calibrator 130 and the adjustment support tool 135 are operated by the worker to perform the 5-point calibration of up and down with 3 points. In the 5-point calibration of up and down with 3 points, in the order of the lower limit (0%) of the measurement range of the instrument 105, the middle point (50%) in the measurement range and the upper limit (100%) of the measurement range, 3 points are measured while increasing the parameter to be measured. Thereafter, in the order of the middle point (50%) of the measurement range and the lower limit (0%) of the measurement range, the remaining two points are measured while decreasing the parameter to be measured. The apparatus 140 acquires the work information about the calibration work and stores the work information in the storage device 150. Specifically, the acquisition unit 200 acquires the work information including the measured value such as a pressure value measured by the device 105 at each point. The measured value such as such a pressure value may be a digital value or an analog value (for example, a current value compatible with pressure).

The storage device 150 stores a plurality of pieces of work information that is acquired by measuring the same instrument 105 at different times such as year 2012, year 2014, year 2016, and year 2018 in the present example and is acquired by the acquisition unit 200. The display processing unit 260 performs the process of displaying the display information according to a plurality of pieces of work information that is acquired at different dates and times.

In the present example, the extraction unit 230 extracts the plurality of data elements including the measured value at each point in the 5-point calibration from the calibration results included in the calibration work information about the instrument 105. The generation unit 240 generates the output information including the measurement error of the instrument 105. The storage processing unit 250 performs the process of storing, in the storage device 150, the output information according to the work information that is acquired for each year. In this manner, the display processing unit 260 performs the process of displaying the change with time of the measurement error of the instrument 105 using the output information stored in the storage device 150. Examples of measurement error include a difference between a set value such as pressure input to the device 105 and the measured value extracted from the calibration result at each point.

The display processing unit 260 can present the tendency of the aging degradation of the instrument 105 in an analyzable form by displaying the change with time of the measurement error of the instrument 105 as in this example. For example, in an example of the present drawing, a user of the apparatus 140 can recognize that among 5 measuring points, the measurement error at the first measuring point (0%) tends to be large, and while from year 2012 to year 2016, the measurement error does not increase largely, from year 2016 to year 2018, the measurement error largely increases and the aging degradation is progressed.

Note that, the display processing unit 260 may perform the process of displaying the measurement error of the instrument 105 before or after the adjustment work. Further, the display processing unit 260 may also perform the process of displaying the tendency of the aging degradation as in the present example for each model of the instrument 105.

Figure 6:
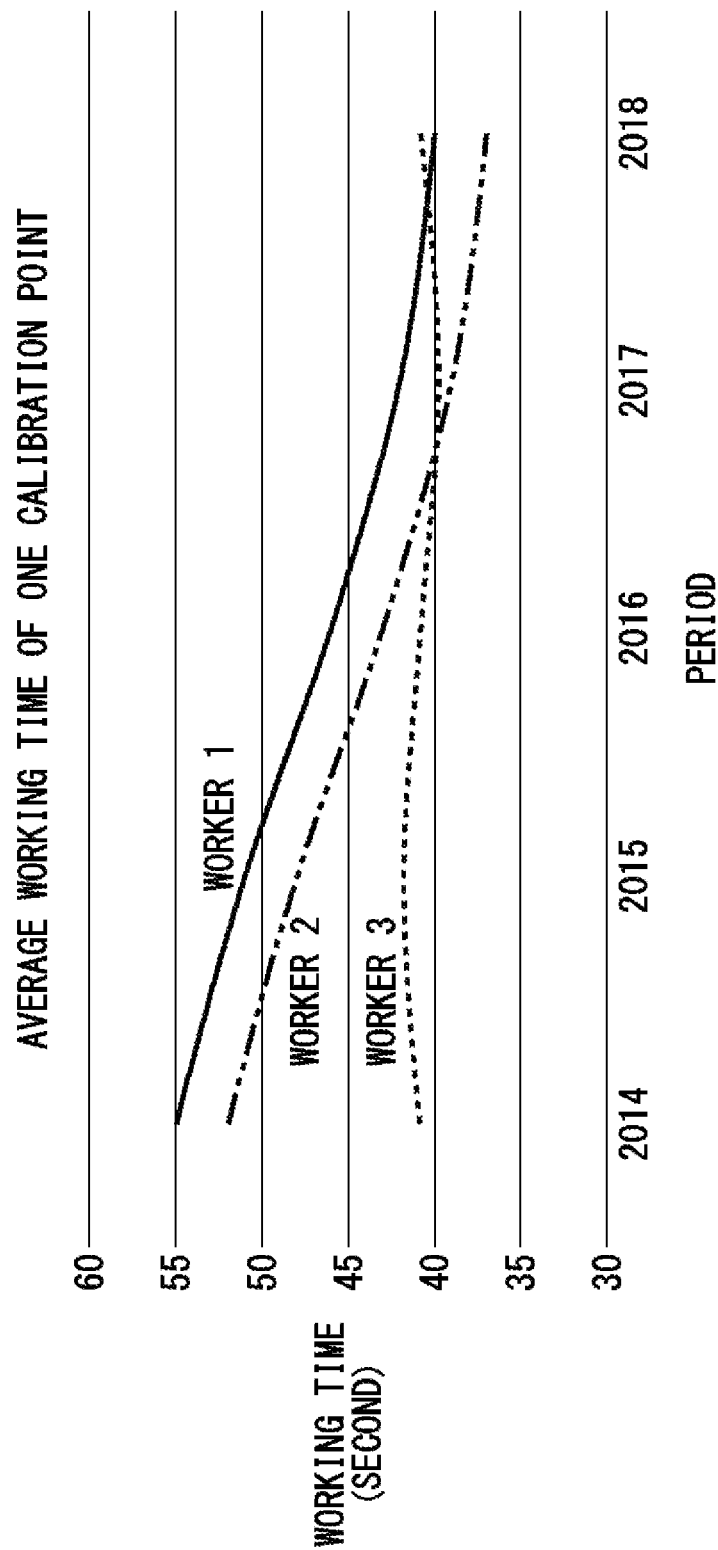
FIG. 6 illustrates a second example of the display information by the apparatus 140 according to the present embodiment.

FIG. 6 illustrates a second example of the display information by the apparatus 140 according to the present embodiment. In the present example, the display processing unit 260 performs the process of displaying, to the display device 160, the display information indicating the transition of the average working time required for each of a plurality of workers 1 to 3 to perform one unit work of the calibration work or the adjustment work.

With respect to the display information of the present example, a graph is shown in which a horizontal axis takes a period and a vertical axis takes a working time. In the present example, the working time is an average value of the working time required to measure one calibration point for each instrument 105 during a corresponding period.

In the present example, the extraction unit 230 extracts the plurality of data elements including the worker who performed at least one of the calibration or the adjustment and the working time required to perform at least one of the calibration or the adjustment from the work information that is acquired by performing for multiple times the maintenance work to each instrument 105 and that includes the worker information, the calibration work information or the adjustment work information. The generation unit 240 generates the output information including the worker and the working time. The storage processing unit 250 performs the process of storing, to the storage device 150, the output information according to each piece of acquired work information.

The display processing unit 260 uses the output information stored in this manner to perform the process of displaying the working time for each worker. In the present example, the display processing unit 260 acquires, from the storage device 150, a plurality of pieces of output information about the maintenance work performed by each worker for each fiscal year and calculates the average value of the working time per calibration point. Then, the display processing unit 260 performs the process of displaying a graph showing the transition of the average working time of each worker. To perform such a display, the generation unit 240 calculates the average value of the working time to cause the average value to be included in the output information, and the display processing unit 260 may perform the process of displaying the average value of the working time calculated by the generation unit 240, the average value being included in the output information.

The display processing unit 260 can present the degree of learning of each worker in an analyzable form by displaying the transition of the working time of each worker as in the present example. The user of the apparatus 140 can use such display information for education planning and evaluation of the worker.

Note that, instead of displaying the working time of each worker, the display processing unit 260 may perform the process of displaying the working time or the transition of the working time for each of groups to which one or more workers belong. Further, the display processing unit 260 may perform the process of displaying the working time of the adjustment work as in the present example. The display processing unit 260 may further perform the process of subdividing the working time of each worker for each model of the instrument 105 and displaying the working time.

Figure 7:
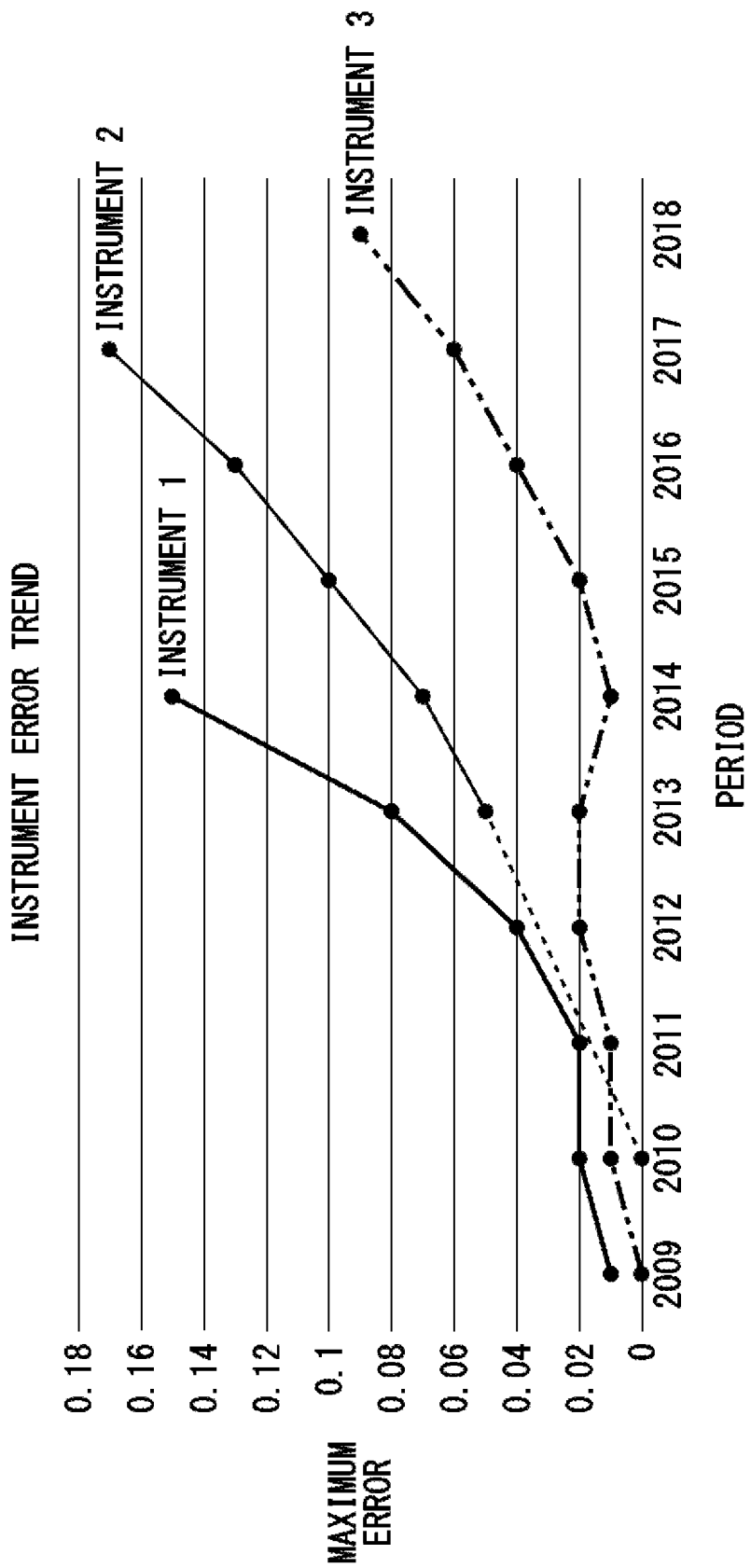
FIG. 7 illustrates a third example of display information by an apparatus 140 according to the present embodiment.

FIG. 7 illustrates a third example of the display information by the apparatus 140 according to the present embodiment. In the present example, the display processing unit 260 performs the process of causing the display device 160 to display the display information indicating the tendency of the aging degradation of the maximum measurement error of each of the plurality of instruments 1 to 3.

With respect to the display information in the present example, a graph is shown in which a horizontal axis takes a period and a vertical axis takes a maximum measurement error. In the present example, the maximum measurement error is a maximum value among measurement errors at a plurality of calibration points in one calibration work.

In the present example, the extraction unit 230 extracts the plurality of data elements including the instrument identification information and the calibration result from the work information that is related to the maintenance work performed for multiple times on each instrument 105 and includes the target instrument information and the calibration work information. The generation unit 240 generates the output information including the instrument identification information and the calibration result. The storage processing unit 250 performs the process of storing, to the storage device 150, the output information according to each of pieces of acquired work information.

The display processing unit 260 performs the process of displaying the change with time of the measurement error of each of a plurality of the instruments 105 in a comparable manner using the output information stored in this manner. In the present example, the display processing unit 260 acquires, from the storage device 150, the output information about the calibration work performed to each instrument in each fiscal year and calculates the maximum measurement error from the measurement errors of a plurality of calibration points included in each piece of output information. Then, the display processing unit 260 performs the process of displaying a graph showing the transition of the maximum measurement error for each instrument. To perform such display, the generation unit 240 may calculate the maximum measurement error to cause it to be included in the output information and the display processing unit 260 may perform the process of displaying the maximum measurement error that is included in the output information and is calculated by the generation unit 240.

The display processing unit 260 can present the tendency of the change in the error of each instrument in an analyzable form by displaying the transition of the measurement error of each instrument as in the present example. The user of the apparatus 140 can determine a next maintenance period of each instrument or set a replacement schedule of each instrument using such display information.

Instead of displaying the transition of the measurement error, the display processing unit 260 may display the transition of the measurement errors collected for each model of the instrument 105. Accordingly, the user of the apparatus 140 can determine a maintenance interval and a replacement interval of the instruments for each model.

In addition to the transition of the measurement error during a use period of the instrument 105, the display processing unit 260 may perform the display processing using the date of manufacture or usage start date of the instrument 105. In an example of the present drawing, the instrument 2 is manufactured in year 2010 and has been used from year 2013. In an example of the present drawing, the display processing unit 260 regards the measurement error of year 2010 that is a year when the instrument 2 is manufactured as zero, and causes the transition indicated by connecting between the measurement error of year 2010 and the measurement error of year 2013 with an auxiliary line (the broken line in the drawing) to be included in the display information. Accordingly, the display processing unit 260 can display the aging degradation caused by the use of the instrument 105 in the plant 100 in a comparable manner with the degradation degree from the date of manufacture or usage start date.

Various embodiments of the present invention may be described with reference to flowcharts and block diagrams, where the blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include either digital or analog hardware circuitry, and may include either integrated circuitry (IC) and discrete circuitry. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 8:
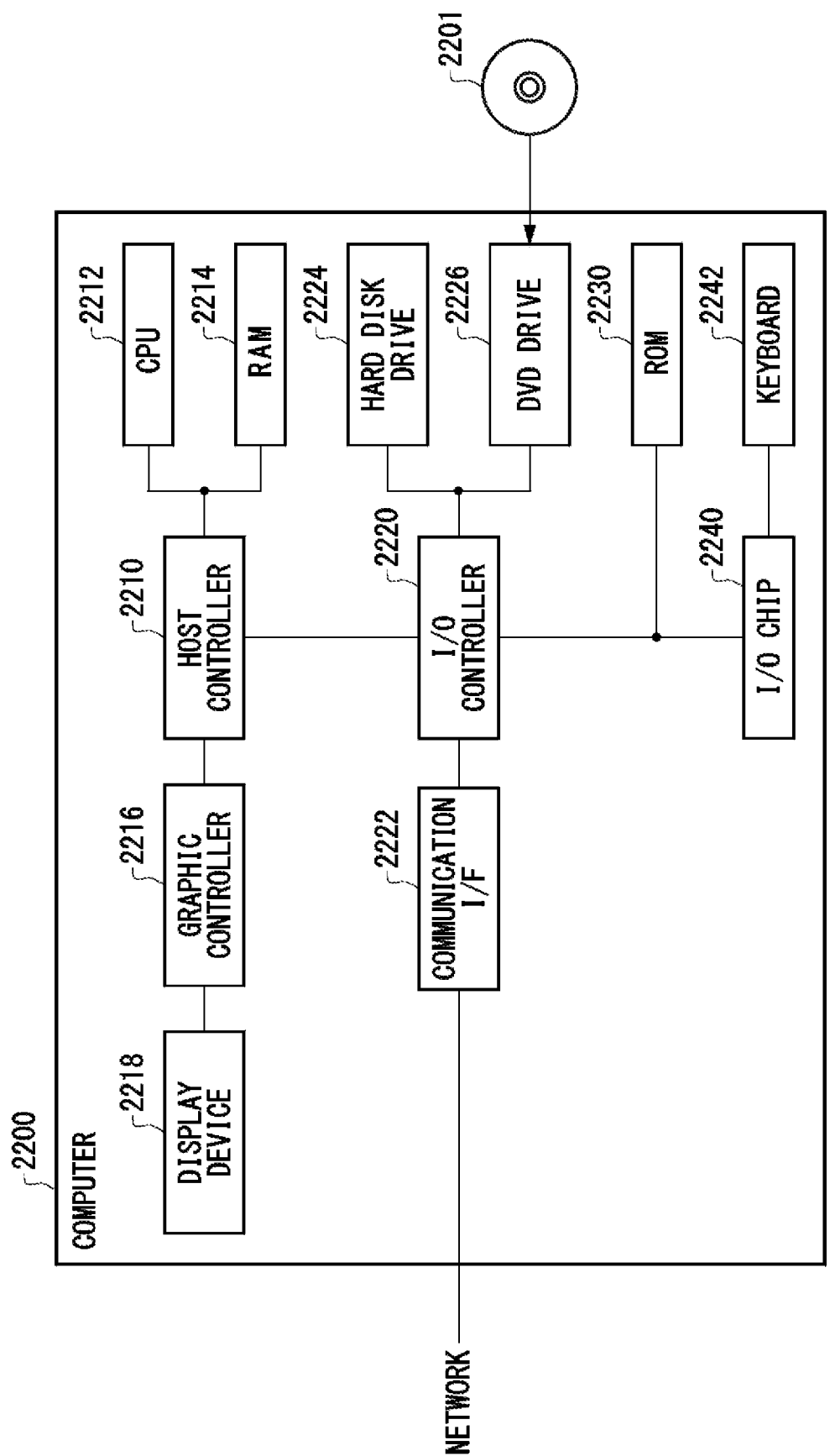
FIG. 8 illustrates one example of a configuration of a computer 2200 according to the present embodiment.

FIG. 8 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads the program and the datum from the IC card and writes the program and the datum to the IC card.

The ROM 2230 stores therein a boot program or the like executed by the computer 2200 upon activation, and a program dependent on the computer 2200 hardware. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An apparatus comprising: an acquisition unit configured to acquire a plurality of calibration work information about a calibration of one or more instruments performed at different dates and times by a maintenance apparatus configured to perform the calibration of the one or more instruments, each of the one or more instruments being a measuring device in a plant; an extraction unit configured to extract, from the calibration work information, a plurality of data elements including the instrument identification information and the calibration result from the calibration work information that is related to the maintenance work performed for multiple times on each of the one or more instruments, the plurality of data elements having a predetermined output format; a generation unit configured to calculate a measurement error for each of the one or more instruments based on the calibration result from the plurality of data elements in a period of time and to generate an output information including an instrument identification information and said measurement error; a storage processing unit configured to store, on a storage device, the output information generated by the generation unit; and a display processing unit configured to acquire the output information from the storage processing unit and to display (1) a change with time of the measurement error of the one or more instruments presenting a tendency of aging degradation of the measurement error, per calibration points, of the one or more instruments, or (2) a change with time of a maximum measurement error of the one or more instruments, presenting the tendency of the aging degradation of the maximum measurement error of each of the one or more instruments, wherein the calibration is an adjustment among 5 measuring points acquired using a 5-point calibration, in the order of a first calibration measuring point at a lower limit point of a measurement range of the one or more instruments, a second calibration measuring point at a middle point in the measurement range, and a third calibration measuring point at an upper limit point of the measurement range, the first second and third calibration measuring points having been measured in order while increasing a parameter to be measured, thereafter a fourth calibration measuring point being measured at the middle point in the measurement range and a fifth calibration measuring point being measured at the lower limit point of the measurement range, the fourth and fifth calibration measuring points having been measured while decreasing the parameter to be measured.

2. The apparatus according to claim 1, wherein
the extraction unit stores a plurality of input formats corresponding to a plurality of types of maintenance apparatuses; and
extracts the plurality of data elements from the calibration work information by using an input format corresponding to a type of the maintenance apparatus that is targeted from the plurality of input formats.

3. The apparatus according to claim 1, wherein
the generation unit generates the output information by arranging the plurality of data elements in an order defined by the output format.

4. The apparatus according to claim 1, wherein
the generation unit causes a result acquired by performing an operation defined by the output format on at least one data element of the plurality of data elements to be included in a part of the output information.

5. The apparatus according to claim 1, wherein
the generation unit generates the output information including a worker who performs the calibration and a working time required to perform the calibration; and
the display processing unit performs a process of displaying, on the display device, the working time for each worker.

6. A non-transitory computer-readable recording medium recording a program that is executed by a computer and causes the computer to function as: an acquisition unit configured to acquire a plurality of calibration work information about a calibration of one or more instruments performed at different dates and times by a maintenance apparatus configured to perform the calibration of the one or more instruments, each of the one or more instruments being a measuring device in a plant; an extraction unit configured to extract, from the calibration work information, a plurality of data elements including the instrument identification information and the calibration result from the calibration work information that is related to the maintenance work performed for multiple times on each of the one or more instruments, the plurality of data elements having a predetermined output format; a generation unit configured to calculate a measurement error for each of the one or more instruments based on the calibration result from the plurality of data elements in a period of time and to generate an output information including an instrument identification information and said measurement error; a storage processing unit configured to store, on a storage device, the output information generated by the generation unit; and a display processing unit configured to acquire the output information from the storage processing unit and to display a change with time of the measurement error of the one or more instruments presenting a tendency of aging degradation of the measurement error, per calibration points, of the one or more instruments, or a change with time of a maximum measurement error of the one or more instruments, presenting the tendency of the aging degradation of the maximum measurement error of each of the one or more instruments, wherein the calibration is an adjustment among 5 measuring points acquired using a 5-point calibration, in the order of a first calibration measuring point at a lower limit point of a measurement range of the one or more instruments, a second calibration measuring point at a middle point in the measurement range, and a third calibration measuring point at an upper limit point of the measurement range, the first second and third calibration measuring points having been measured in order while increasing a parameter to be measured, thereafter a fourth calibration measuring point being measured at the middle point in the measurement range and a fifth calibration measuring point being measured at the lower limit point of the measurement range, the fourth and fifth calibration measuring points having been measured while decreasing the parameter to be measured.

7. The non-transitory computer-readable recording medium according to claim 6, wherein
the extraction unit stores a plurality of input formats corresponding to a plurality of types of maintenance apparatuses; and
uses an input format according to a type of the maintenance apparatus that is targeted from the plurality of input formats and extracts the plurality of data elements from the calibration work information.

8. The non-transitory computer-readable recording medium according to claim 6, wherein
the generation unit arranges the plurality of data elements in an order defined by the output format and generates the output information.

9. The non-transitory computer-readable recording medium according to claim 6, wherein the generation unit causes a result acquired by performing an operation defined by the output format on at least one data element of the plurality of data elements to be included in a part of the output information.

10. A method comprising: acquiring, by a device, a plurality of calibration work information about a calibration of one or more instruments performed at different dates and times by a maintenance apparatus configured to perform the calibration of the one or more instruments, each of the one or more instruments being a measuring device in a plant; extracting, by the device, from the calibration work information, a plurality of data elements including the instrument identification information and the calibration result from the calibration work information that is related to the maintenance work performed for multiple times on each of the one or more instruments, the plurality of data elements having a predetermined output format; generating, by the device, a measurement error for each of the one or more instruments based on the calibration result from the plurality of data elements in a period of time and to generate an output information including an instrument identification information and said measurement error; storing, on a storage device, the output information generated by the generating; and display processing to acquire the output information from the storage device and to display a change with time of the measurement error of the one or more instruments presenting a tendency of aging degradation of the measurement error, per calibration points, of the one or more instruments, or a change with time of a maximum measurement error of the one or more instruments, presenting the tendency of the aging degradation of the maximum measurement error of each of the one or more instruments, wherein the calibration is an adjustment among 5 measuring points acquired using a 5-point calibration, in the order of a first calibration measuring point at a lower limit point of a measurement range of the one or more instruments, a second calibration measuring point at a middle point in the measurement range, and a third calibration measuring point at an upper limit point of the measurement range, the first second and third calibration measuring points having been measured in order while increasing a parameter to be measured, thereafter a fourth calibration measuring point being measured at the middle point in the measurement range and a fifth calibration measuring point being measured at the lower limit point of the measurement range, the fourth and fifth calibration measuring points having been measured while decreasing the parameter to be measured.

11. The method according to claim 10, wherein the extracting comprises
storing a plurality of input formats corresponding to a plurality of types of maintenance apparatuses; and
using an input format according to a type of the maintenance apparatus that is targeted from the plurality of input formats and extracting the plurality of data elements from the calibration work information.

12. The method according to claim 10, wherein
the generating comprises arranging the plurality of data elements in an order defined by the output format and generating the output information.

13. The method according to claim 10, wherein
the generating comprises causing a result acquired by performing an operation defined by the output format on at least one data element of the plurality of data elements to be included in a part of the output information.

* * * * *